Aug. 13, 1935.  G. VIANINI  2,011,463

PIPE MANUFACTURING MACHINE

Filed Nov. 9, 1933  3 Sheets-Sheet 1

G. Vianini
INVENTOR

By: Marks & Clerk
Attys.

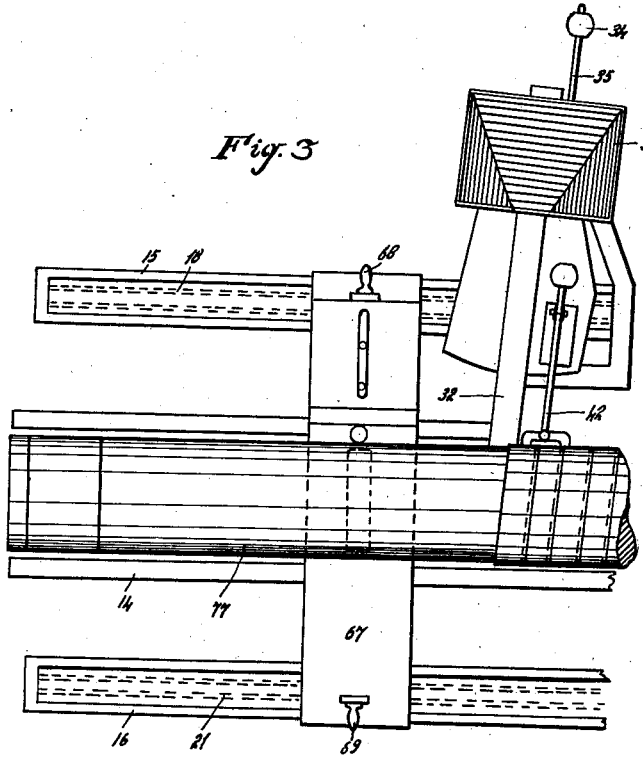

Aug. 13, 1935.   G. VIANINI   2,011,463
PIPE MANUFACTURING MACHINE
Filed Nov. 9, 1933   3 Sheets-Sheet 3

G. Vianini
INVENTOR
By Marks & Clerk
Attys.

Patented Aug. 13, 1935

2,011,463

UNITED STATES PATENT OFFICE 2,011,463

PIPE MANUFACTURING MACHINE

Guido Vianini, Rome, Italy

Application November 9, 1933, Serial No. 697,345
In Italy June 6, 1933

1 Claim. (Cl. 25—30)

Pipes made of plastic material as concrete, fibrous concrete and the like, either reinforced or not, are taking a very large diffusion. Besides even the metallic pipes when subjected to deteriorating agents, are to be protected with a layer of plastic material which preserves them against the action of such deteriorating agents.

Machines of various kinds have been proposed for performing all the operations which are inherent to the production of pipes of plastic material or of metallic pipes coated with a plastic material, but such machines as made so far are very expensive and cumbersome. Besides each machine can only be used for a given step or kind of work with the result that the manufacturing plants must be supplied with a large number of different machines, which results in a fruitless employment of capital.

It was therefore not possible so far to establish small plants which should provide each to the local use; the pipes were consequently made in a few works so that when said pipes had to be used in distant places from the place of production, the heavy cost of freight substantially affected their cost.

It is an object of this invention to provide a machine which is simple, strong and cheap, and adapted to perform all the operations that will be specified hereinafter and which are inherent to the production of pipes or other hollow bodies of concrete material or the like, either reinforced or not and also adapted to the coating of metallic pipes.

The machine according to the invention is adapted to perform the various operations one after another, but it can perform at the same time two operations which do not interfere with one another. The reinforcement that this machine can apply is of the type comprising a steel or other metallic wire, wound upon a pipe in equally spaced spirals under a predetermined and constant tension. It will appear, however, that pipes made with said machine can also be reinforced, without any difficulty, by reinforcements of any other suitable kind.

The accompanying drawings show a machine according to this invention, which is adapted to perform the following operations: the production of cylindrical or polygonal not reinforced hollow bodies, made of concrete mixed with asbestos or other fibres, of argillous or bituminous material, either with the association with fibres or not; the compression of the pipes made as stated hereinabove; the production of pipes of fibrous concrete (a mixture of concrete and asbestos) and of concrete admixed with another fibrous material with the contemporary compression of the pipe wall and the application of a metallic reinforcement under a tension; the application of a metallic reinforcement made of a series of spirals under a tension on pipes or other cylindrical bodies in general, made of concrete material with or without the association of fibres, or also of metal or other material; the application on metallic or other pipes of protective layers of concrete or other suitable material in order to protect said pipes against the action of deteriorating agents, with or without the incorporation into the protecting layer of a reinforcing wire net.

In the drawings:

Figure 3 is a fragmentary plan view of the machine having a special movable head which is to be used particularly when applying a protective layer on relatively long and flexible pipes;

Figure 4 is a top plan view of the device adapted to give the reinforcing wire a given and exactly constant tension;

Figure 8 is a detail showing the pulley that controls the device shown in Figures 4 and 5;

Figure 9 is a detail of the guiding means for the plastic material feeding band;

Figure 10 is a detail of one of the supporting rollers belonging to the device of Figure 7;

Figure 1:
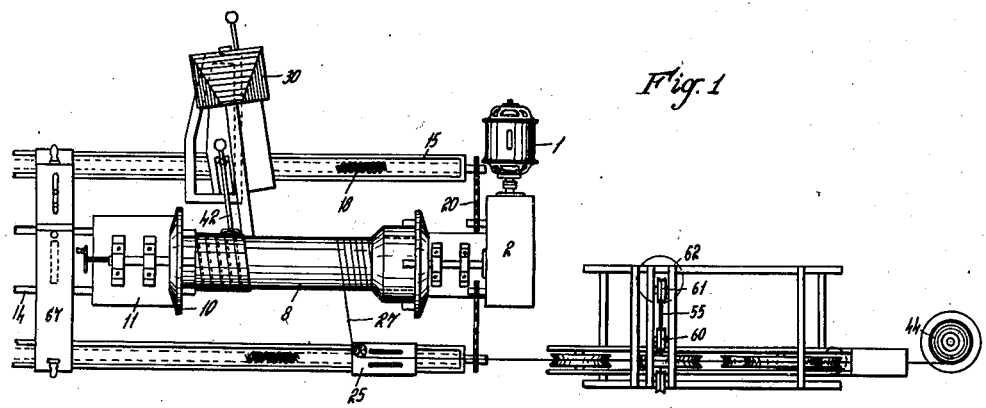
Figure 1 is a top plan view of the whole machine.
Figure 2:
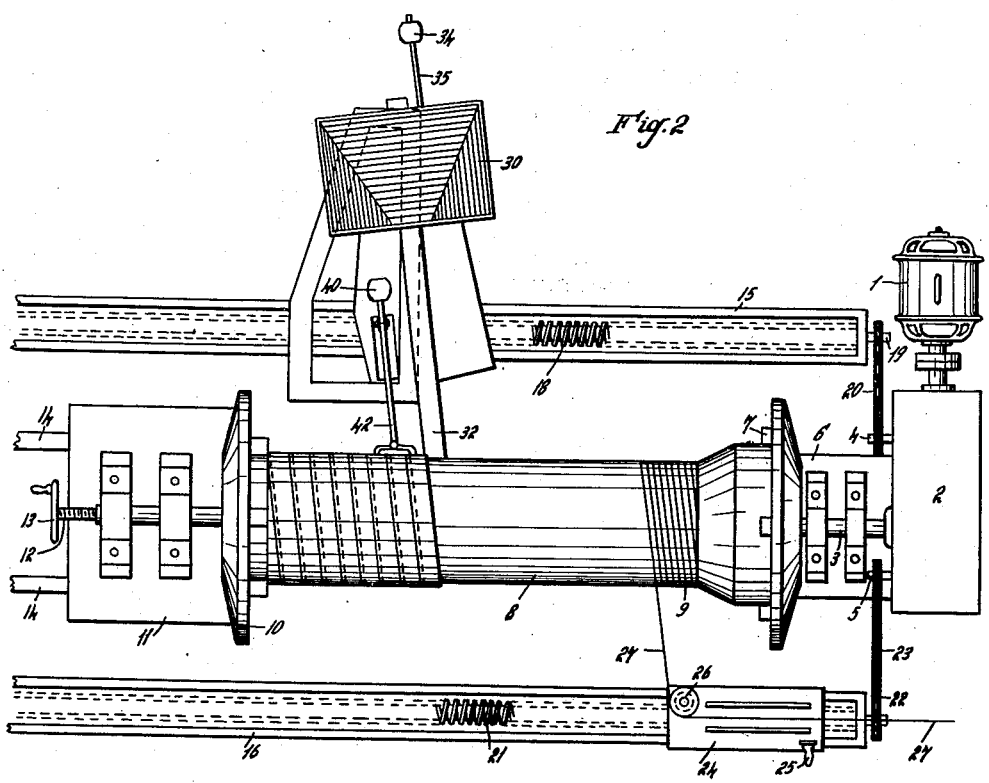
Figure 2 is an enlarged partial plan view of the machine having a head designed for use in the production of pieces made of plastic material and in the application thereon of a reinforcement under a tension.

The driving motor 1 is coupled with suitable gearing within a box 2 not to be described, said gearing being adapted to transmit movement at any desired ratio and in the desired direction to a shaft 3 and to pinions 4 and 5, independently from one another. Shaft 3 is supported in a head 6 and transmits motion to a face plate 7 provided with a self centering apparatus serving to secure either one of the ends of the cylindrical mould on which the pipe is to be formed, or one of the ends of the pipe to be reinforced or coated, etc. The right hand side of Figure 2 shows a pipe on which a special reinforcement 9 is being applied, whilst the left hand side of said figure shows the method of application on a pipe or a mould of a layer of a plastic material of any kind whatever.

The other end of pipe 8 is secured to a self centering apparatus 10 supported on a head 11 with respect to which it may be slightly displaced by means of a screw 12 which is supplied with a hand wheel 13. The head 11 may slide on two strong rails 14 in order to be positioned at the necessary distance from head 6 and fixed at the desired point by any convenient securing means not to be described. Said rails 14 are but partially shown but they may obviously extend for the whole length of the machine.

Parallel to the axis of the machine is on one side a grooved guiding member 15, another grooved guiding member or channel 16 being situated on the other side of the machine. Secured in the middle of the guide piece 15 is an endless screw 18 on one end of which is mounted a toothed pinion 19 adapted to receive movement from pinion 4 through a chain 20.

Similarly in the grooved guiding piece 16 is situated an endless screw 21 that carries a toothed pinion 22 which is connected to pinion 5 through a chain 23.

As it has been stated with reference to box 2 containing the gearing means, the endless screws 18 and 21 may be independently rotated both as to direction of rotation and to speed.

The endless screw 21 cooperates with a female screw which is situated inside a small carriage 24 having blocking means not shown which are controlled by a hand piece 25, said carriage carrying also a grooved wheel 26 which has the purpose to guide wire 27 for changing its direction. In order to prevent wire 27 from too sharply deflecting, said wheel 26 in the practice may be substituted by a set of wheels which gradually take the wire on to the new direction.

The small carriage 25 should of course well bear on anti-friction rollers on both sides against the inner walls of the grooved guide 16 in order to prevent the tension of the wire 27 from causing a side stress on screw 21.

The means for giving the wire 27 the desired tension will be fully described further on.

The other grooved guide 15 serves to support the plastic material feeding device which is longitudinally moved by screw 18 working in a suitable nut in the supporting base 28 of said feeding device, on which base is supported a platform 29 which is adapted to be swung around a pivot not shown.

Platform 29 supports a hopper 30 into which plastic material is poured, the discharge opening of said hopper being controlled by an adjustable trap not to be particularly described. When pouring from hopper 30, the plastic material drops upon a band of canvas 32 unwinding from a brake controlled bobbin 33 the action of which brake may be varied at will by moving a weight 34 on an arm 35 thereof.

For operation, the device is brought near one of the heads and then the end of band 32 is secured on the pipe or the mould on which the plastic material must be applied or also on the pipe or mould supporting member, which latter is then rotated at the same time as screw 18. The rotation of the pipe causes band 32 to unwind from bobbin 33, the tension of the band being determined by the position of the weight 34 on the brake controlling arm 35. Band 32 passing under the discharge opening of hopper 30 is fed with the plastic material to be carried on to the mould or the pipe.

Band 32 passes on between two guiding members 36 and 37 mounted on a platform 29; the inner wall of member 36, which is placed forward with respect to the direction of longitudinal movement of the plastic material feeding device, is vertical; member 37 on the contrary, is made with a projection 38 which covers one edge of band 32. Therefore the plastic material will be allowed to cover only the portion of band 32 which lays between guiding member 36 and the inner face of the projecting portion 38 of member 37. The edge of band 32 which runs underneath the projecting portion 38 will not be covered with plastic material; said uncovered edge serving to overlap the edge of the preceding spiral of plastic material on the pipe in order to prevent said material from spreading out when the tension of band 32 is high.

A roller 39 is so positioned as to constantly apply a pressure on the joint between any two adjacent spirals of plastic material, in order to regularize said joints and assist the proper positioning of the band of canvas 32. The pressure exerted by roller 39 may be varied by means of a weight 40 adjustably mounted on the roller supporting arm 42 which is pivoted at 41.

When the feeding device has reached the end of its travel, should a new layer be applied, said device is caused to go back in order to restore band 32 in its rolled condition, and then the application of the new layer will be started. Should no other layers of plastic material be applied, band 32 will be left in place for an eventual operation of compression or at least until the concrete will have set.

Figure 5:
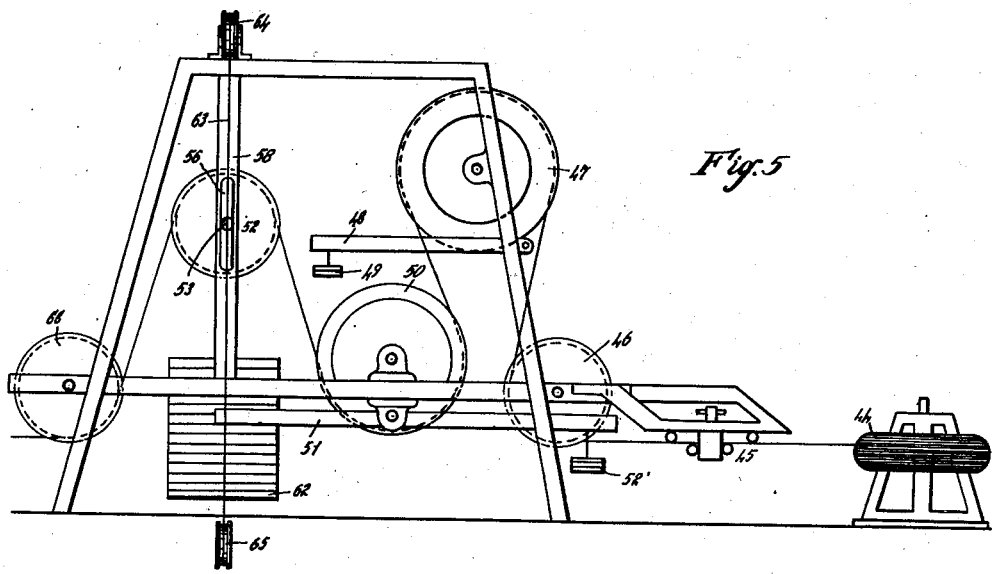
Figure 5 is an elevation view of the device of Figure 4.
Figure 6:
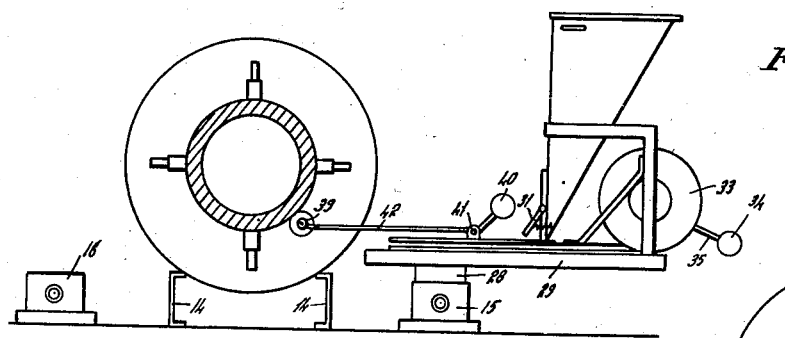
Figure 6 is an elevation view of the plastic material feeding device.
Figure 7:
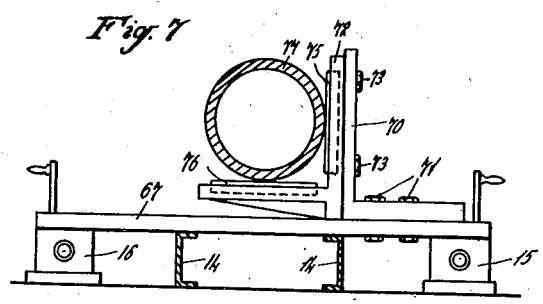
Figure 7 is an end view of the supporting means for long and flexible pipes.

Figures 4 and 5 show a device adapted to give the reinforcing wire 27 a tension the value of which is adjustable according to desire and remains strictly constant.

The principal members of said device which will be now described, are in an alignment with the endless screw 21 which controls the movement of carriage 24 and therefore the spacing of the spirals.

On unwinding from roller 44 the wire 27 passes first through a wire straightening brake which is designated as a whole by 45, and then through a pulley 46 which directs it on to another pulley 47. Said pulley 47 is supplied with a band brake which is controlled by a weight 49 adjustably mounted on an arm 48. From pulley 47 the wire passes downward to a pulley 50, said pulley being supplied with a band brake controlled by an arm 51 which carries on one end a weight 52' the value of which may be varied; the other end of said arm 51 being connected to a device which feels the variations of tension of the wire, as will be specified hereinbelow.

From pulley 50 the wire 27 is directed upwards on to a pulley 52 the spindle 53 of which is carried by a yoke 54 which hangs from a rope 55. The ends of said spindle 53 extend through vertical slots 56 and 57 on posts 58 and 59 respectively. Rope 55 passes upon idle pulleys 60 and 61 which are supported by the upper portion of the frame of the said device. Fastened at the end of rope 55 is a weight 62 the value of which must be established according to the tension to give to the reinforcing wire.

To the upper portion of the yoke 54 another rope 63 is secured, which passes over a pulley 64 turning then downwards to pass under another pulley 65 and is finally fastened on the left end of arm 51. Pulley 65 is connected to the frame by means not shown that will permit its vertical movements.

The frame comprises a certain number of upright posts and cross bars not particularly described.

From pulley 52 the wire 27 is directed downwards to a guiding pulley 66 which sends it forward to the distributing carriage 24.

The value of weight 62 is determined according to the tension to which wire 27 is to be subjected and the weights 52' and 49, as well as the wire straightening brake 45 are so adjusted that pulley 52 will remain in equilibrium and the weight 62 will remain suspended during the winding of the reinforcing wire under the desired tension.

To start the operation of winding the reinforcing wire, the carriage 24 will be brought close by one of the heads of the machine and the wire 27 will be fastened in any suitable way either on the pipe to be reinforced or to one of the self centering apparatuses or even to another convenient member. Weight 62 is now on the ground. Brake 45 will now be blocked and the pipe set to rotate at a very low speed. When weight 62 will be sufficiently raised, the brake 45 will be freed and the rotation speed will be increased as convenient. The endless screw 21 should of course rotate at a convenient speed in relation to the distance between the successive spirals.

As long as no accidental perturbations occur, pulley 52 and all the other members of the device, will remain in the initial relation. Supposing now that the tension on the wire increases owing to an increased friction or other reasons, this increased tension will cause wire 27 to exert a greater strain on pulley 52 and consequently a downward movement of this latter; the end of rope 63 connected with yoke 54 will be pulled down with the result that the left end of arm 51 is lowered. The action of the brake on pulley 50 will therefore be lessened as far as to compensate for the accidental causes which have produced the increase of tension. On the contrary, when a diminution of the tension takes place, pulley 52 will draw the left end of arm 51 upwards, and as the brake action on pulley 50 will consequently be increased, the normal condition will be restored. When the reinforcement will be finished, some of its spirals will be welded together and then the wire cut away.

The above described machine should serve, to the above mentioned ends, also to coating metallic or other pipes with a protective layer of plastic material.

The elements of metallic pipings are generally long and relatively flexible and therefore should a fixed head 11 as illustrated in Figure 2 be employed, the tension of the plastic material feeding band would cause a deformation of the pipe, particularly when said band works far away from the ends of the pipe.

This difficulty is overcome by providing a special movable head, which is designed as a whole by 67.

The head 67 consists in general in a carriage supported by the guiding members 15 and 16, and it may be connected with the two endless screws 18 and 21 by means of couplings operated by hand pieces 68 and 69. When both couplings are in working condition, the displacement of screws 18 and 21 causes the axial translation of the carriage. Obviously in this case the two endless screws must rotate at the same speed and in the same direction.

The head 67 carries a square supporting member 70 secured thereon by means of bolts 71 or otherwise, in such a manner that it may be moved to and from the rotation axis of the machine, dependently from the diameter of the pipe being coated.

This support 70 carries an angular piece 72 which is secured to it by means of bolts or the like 73, said member 72 being adapted to be positioned at the desired height. Member 72 supports a vertical roller 75 and a horizontal roller 76 by means of ball or roller bearings 74, as shown as an example in Figure 10.

In these conditions a pipe 77 of any diameter whatever is supported by roller 76 and laterally, towards the part where the plastic material feeding device is placed, it bears against roller 75.

Of course instead of a single vertical roller or a single horizontal roller a series of rollers may be placed in order to afford a better support to the tube.

As shown in Figure 3, when a protecting layer must be set on a metallic pipe as 77, the pipe is secured on one side on to the self centering apparatus 7, whilst it is placed upon the rollers of the movable head 67. The plastic material feeding device will be positioned near the fixed head 6 while the movable head 67 will be brought as near as possible to said plastic material feeding device; on starting the operation, as the plastic material feeding device is moved by screw 18, which together with screw 21 moves the movable head 67 as well, these two devices will move together remaining near to one another, and the tension of band 32, owing to the proximity of the lateral support which consists of the roller 75, will not be able to cause the deformation of the pipe.

The pipes reinforced by an armature under a tension must as a rule be coated with a protecting layer. In this case, after starting with the winding of the reinforcement and as soon as carriage 24 has moved a little away from the starting head, the plastic material feeding device is moved as well, so that the two operations may proceed at the same time.

It should be well understood that with each operation of the plastic material feeding device a layer of a limited thickness may be applied. Consequently a single operation may be only sufficient for coating a metallic pipe, for coating an already finished and reinforced pipe, and for producing light pipes preferably made of fibrous material which are not to be submitted to heavy stresses. In all other instances where the thickness of the plastic material must be great, a first application of said plastic material will be effected, then through sending the feeding device back, band 32 will be taken away and wound again on its bobbin 33 and the machine will be ready to apply another new layer of plastic material, and so on.

Figure 11:
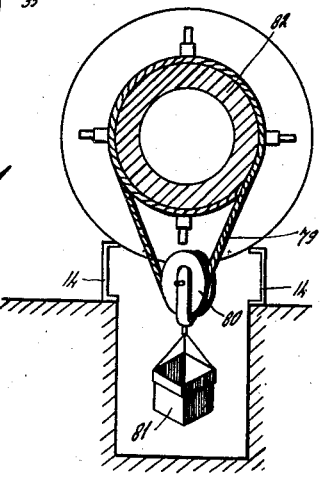
Figure 11 is a cross sectional view of a pipe on which the endless compressing cord is applied.

Figure 11 shows how a pipe 82 may undergo on the same machine the operation of compression according to my pending patent application Ser. No. 600,353. In this case it will be necessary that a longitudinal channel be provided between the guiding members 14 having such a depth as to freely accommodate a bucket 81 which is suspended through a pulley 80 to the endless cord 79.

Means may be incorporated in the machine adapted to increase the ballast in bucket 81 at the end of the travel of the group of spirals and to reverse at each end of travel the direction of revolution of the pipe, according to what has been set forth in the above mentioned patent application.

It has been said at the beginning that the protecting layer for metallic pipes or the like should be adapted to be reinforced if desired by means of a wire net. To do this it has been found convenient to employ a band of wire net having the same width as the canvas band 32. The wire net band will be superposed to the canvas band and the operation of the plastic material feeding device will then be started. The plastic material pouring from hopper 30 will drop upon the wire net, but due to its plastic condition it will pass through the meshes of the wire net and come to contact with the canvas. During the operation of winding, due to the tension of band 32 and even more to the pressure being applied by roller 39, the plastic material will go outwards through the meshes of the net, and the wire net will finally remain imbedded in the plastic material, as desirable.

Even in this case the coated pipe may undergo the operation of compression above referred to.

After the formation of a pipe of plastic material and before the application of the reinforcement under a tension, axial reinforcing rods may be placed on the pipe; said axial reinforcing rods may be previously connected to one another so as to form a whole adapted to be wrapped around the pipe and readily secured thereon.

Although I have illustrated the preferred form of the invention and have described that form in detail, it will be apparent to those skilled in the art that the invention is not so limited but that various modifications may be made therein without departing from the spirit of the invention or from the scope of the appended claim.

What I claim is:

An apparatus for winding reinforcing wire on an annulus of plastic material comprising a core for supporting the annulus, a guiding structure, and an endless screw, mounted parallel to said core, a wire guide mounted for travel on said guiding structure and engaging said endless screw, means for rotating said core and said screw at relatively adjustable speeds, and means for maintaining wire fed to said annulus under constant predetermined tension comprising a frame, a straightening brake adapted to grasp the wire, a series of guiding pulleys by which the wire may be guided, posts on said frame having vertical slots therein, a yoke, a pulley above said yoke and a flexible band connected to said yoke and passing over said last named pulley, and weights attached to said flexible band, a spindle serving as the axis of one of said guiding pulleys which lies between the prongs of the yoke, said spindle passing through the said slots whereby it is movable in a vertical direction, a brake band on one of the guide pulleys and a lever attached to said band one arm of said lever having a weight attached thereto, and a flexible band connecting the other arm to the upper portion of the yoke so that downward motion of the yoke will lower the left hand end of the lever.

GUIDO VIANINI.